US012146598B2

(12) United States Patent
McClintock (10) Patent No.: US 12,146,598 B2
(45) Date of Patent: Nov. 19, 2024

(54) INLINE ULTRASONIC ATTENUATOR WITH HELICAL BAFFLE

(71) Applicant: Big Elk Energy Systems, LLC, Tulsa, OK (US)

(72) Inventor: Dennis McClintock, Tulsa, OK (US)

(73) Assignee: Big Elk Energy Systems, LLC, Tulsa, OK (US)

( * ) Notice: Subject to any disclaimer, the term of this patent is extended or adjusted under 35 U.S.C. 154(b) by 352 days.

(21) Appl. No.: 17/591,261

(22) Filed: Feb. 2, 2022

(65) Prior Publication Data

US 2022/0243853 A1    Aug. 4, 2022

Related U.S. Application Data

(60) Provisional application No. 63/144,762, filed on Feb. 2, 2021.

(51) Int. Cl.
*F16L 55/027* (2006.01)
*G01F 1/66* (2022.01)

(52) U.S. Cl.
CPC ... *F16L 55/02718* (2013.01); *F16L 55/02736* (2013.01); *G01F 1/662* (2013.01)

(58) Field of Classification Search
CPC ................................ F16L 55/027; F16L 55/04
USPC ........................ 138/44, 37, 39; 366/338, 339
See application file for complete search history.

(56) References Cited

U.S. PATENT DOCUMENTS

| | | | | |
|---|---|---|---|---|
| 2,601,018 A | * | 6/1952 | Heyl | B01F 25/4314 366/339 |
| 3,635,444 A | * | 1/1972 | Potter | B01F 25/43141 366/339 |
| 3,704,006 A | * | 11/1972 | Grout | B01F 25/4331 366/339 |
| 3,827,888 A | * | 8/1974 | Terwilliger et al. | G03C 1/015 430/599 |
| 3,862,022 A | * | 1/1975 | Hermann | C25B 9/17 366/339 |
| 3,953,002 A | * | 4/1976 | England, Jr. | B01F 23/47 366/322 |
| 4,466,741 A | * | 8/1984 | Kojima | B01F 25/43141 138/37 |

(Continued)

FOREIGN PATENT DOCUMENTS

| | | |
|---|---|---|
| EP | 2426427 A2 | 3/2012 |
| FR | 2860854 A1 | 9/2008 |
| FR | 3063812 A1 | 9/2018 |

*Primary Examiner* — Patrick F Brinson
(74) *Attorney, Agent, or Firm* — GableGotwals (57) ABSTRACT

An in-line ultrasonic attenuator (10) of this disclosure includes a longitudinally extending pipe (20) having a first and second end (21, 31), and a constant inside diameter extending an entire distance between the first and second ends. Instead of plates, the attenuator includes at least one helical baffle (23 or 33), or a first and a second helical baffle (23, 33) arranged in series with one another, coaxial to the longitudinal center line of the longitudinally extending pipe. The first helical baffle has a first twist rotation and the second helical baffle has a second twist rotation opposite that of the first twist, each twist rotation being at least 180°. The pipe ID can be the same as that connected to the ultrasonic gas flow meter. No elbows are required at the front or back end of a measurement skid of which the attenuator is a part.

30 Claims, 6 Drawing Sheets

(56) References Cited

U.S. PATENT DOCUMENTS

| | | | | |
|---|---|---|---|---|
| 4,522,504 A * | 6/1985 | Greverath | ............ | B01F 25/433 |
| | | | | 138/40 |
| 4,850,705 A * | 7/1989 | Horner | .............. | B01F 25/43141 |
| | | | | 366/338 |
| 5,307,867 A * | 5/1994 | Yasuda | ................... | F28F 13/12 |
| | | | | 366/338 |
| 10,365,138 B1 | 7/2019 | McClintock | | |
| 10,655,990 B1 | 5/2020 | McClintock | | |
| 2004/0124136 A1* | 7/2004 | Bak | ........................ | B01J 19/006 |
| | | | | 210/512.1 |
| 2009/0071336 A1* | 3/2009 | Jernberg | ............ | B01F 27/1142 |
| | | | | 366/314 |

* cited by examiner

INLINE ULTRASONIC ATTENUATOR WITH HELICAL BAFFLE

CROSS-REFERENCE

This application claims priority to U.S. 63/144,762 filed Feb. 2, 2021.

BACKGROUND

This disclosure relates to gas flow measurement equipment and, in particular, to equipment, systems, and methods designed to improve the accuracy of gas flow measurement in custody transfer transactions along a gas pipeline. Because of the tremendous volume of gas being transferred between pipeline companies, small measurement errors can have very large financial effects.

To measure gas flow through a pipeline, ultrasonic gas flow meters are placed along a section of pipe. The meter is located between a front end treatment and a backend treatment. While certain details of the end treatments may vary between pipelines, all include elbows. By way of an example, in one design a front end treatment or elbow diverts the main pipeline flow toward the flow meter and reduces swirl using a flow conditioner placed 10 pipeline diameters ahead of the flow meter. The conditioner provides a bullet-nosed gas flow profile into the meter. A backend treatment or elbow located at least 5 pipeline diameters after the meter brings the now-measured gas flow back in line with the main pipeline. The backend elbow, along with a blind flange located opposite the main pipeline, helps attenuate ultrasonic waves generated by downstream equipment such as a control valve and prevents those waves from traveling back to the flow meter and interfering with flow measurement.

The use of elbows at the front and back end of the flow meter section widens the footprint of the section. Therefore, a wide skid must be built to support the section and special permits must be obtained to transport the skid to the job site. A need exists for an ultrasonic attenuation treatment that can eliminate the use of elbows.

U.S. Pat. No. 10,365,138 B1 and U.S. Pat. No. 10,655,990 B1 to McClintock, the content of which is incorporated by reference herein, disclose an in-line ultrasonic attenuation end treatment for use with an ultrasonic gas flow meter. The end treatment makes use eccentric reducers at each end and a series of plates arranged perpendicular or at an angle to the midline of the longitudinally extending pipe located between the reducers. Embodiments of the present disclosure do not require the eccentric reducers nor make use of plates as the baffle.

SUMMARY

An in-line ultrasonic attenuator of this disclosure includes a longitudinally extending pipe having a first end, a second end, and a constant inside diameter extending an entire distance between the first and second ends. The first and second ends may be flanged ends. Instead of plates, the attenuator includes at least one helical baffle, or a first and a second helical baffle arranged in series with one another, coaxial to the longitudinal center line of the longitudinally extending pipe. The first helical baffle has a first twist rotation and the second helical baffle has a second twist rotation opposite that of the first twist, each twist rotation being at least 180°. The twist rotation may be up to 190°. When in an intended use, no elbows are required at the front or back end of a measurement skid of which the attenuator is a part.

Each helical baffle provides the equivalent of a blind flange. The pipe wall-facing surface of each baffle can be corrugated rather than smooth to provide more refection points (and therefore attenuation surfaces).

In some embodiments, the first and second helical baffles may include a plurality of bars, each bar of the plurality having a length equal to that of the constant inside diameter of the longitudinally extending pipe and being oriented at a different angular orientation than a corresponding adjacent bar of the plurality. The bars of the plurality may be square in cross-section.

In embodiments of a method for attenuating ultrasonic waves downstream of a ultrasonic gas flow meter, the method includes providing an in-line ultrasonic attenuator of this disclosure. The attenuator may be included as part of a measurement skid. When in an intended use, the method further includes attenuating the ultrasonic waves of the meter with the in-line ultrasonic attenuator and passing a natural gas flow along a pipe wall-facing side of the first and second helical baffles.

BRIEF DESCRIPTION OF THE DRAWINGS

FIG. 1 is front (end) view of an embodiment of an in-line ultrasonic attenuator of this disclosure. The attenuator includes at least one helical baffle. The attenuator may include a first and a second helical baffle having opposite rotations. For example, the first baffle may have a left-hand rotation and the second baffle may have a right-hand rotation (or vice versa). Two or more pairs of helical baffles may be included.

DETAILED DESCRIPTION

Figure 1:
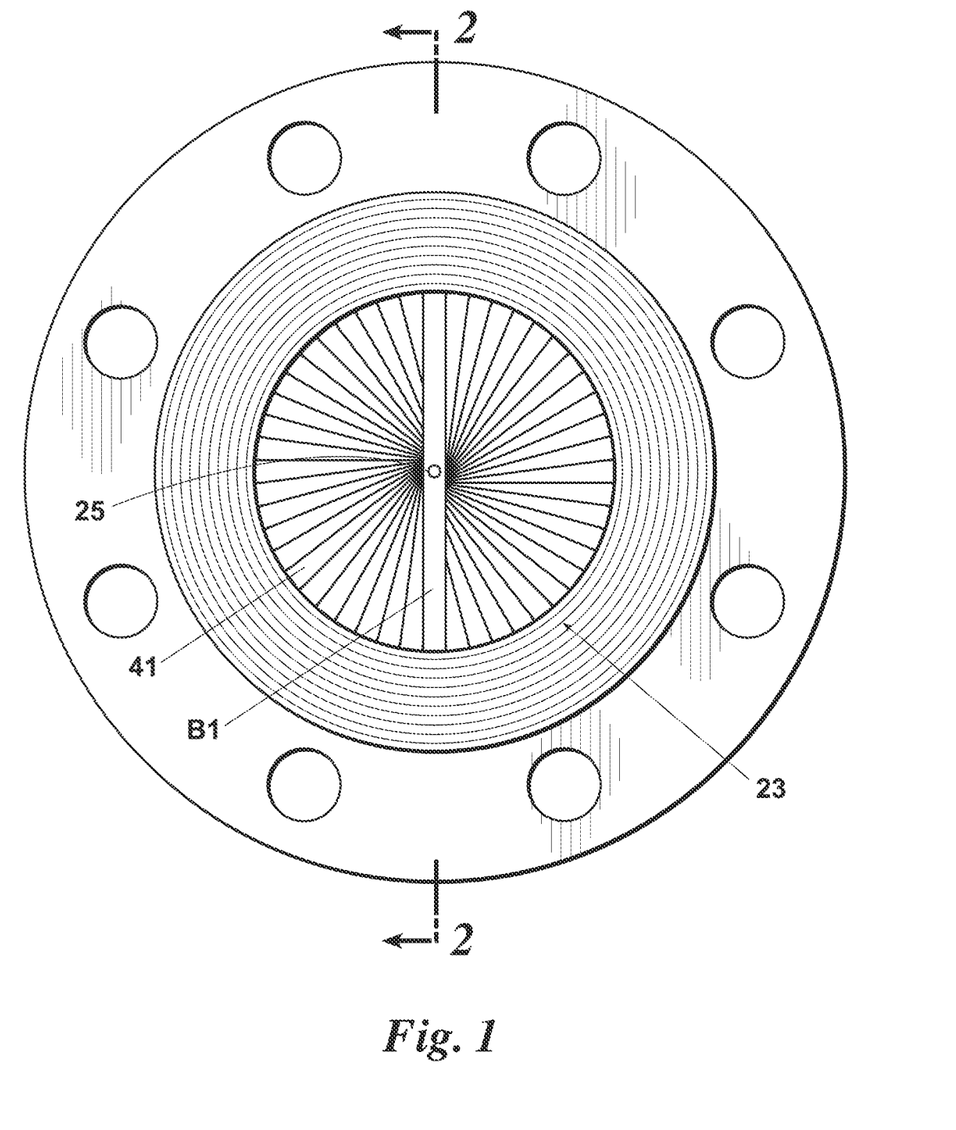
Figure 2:
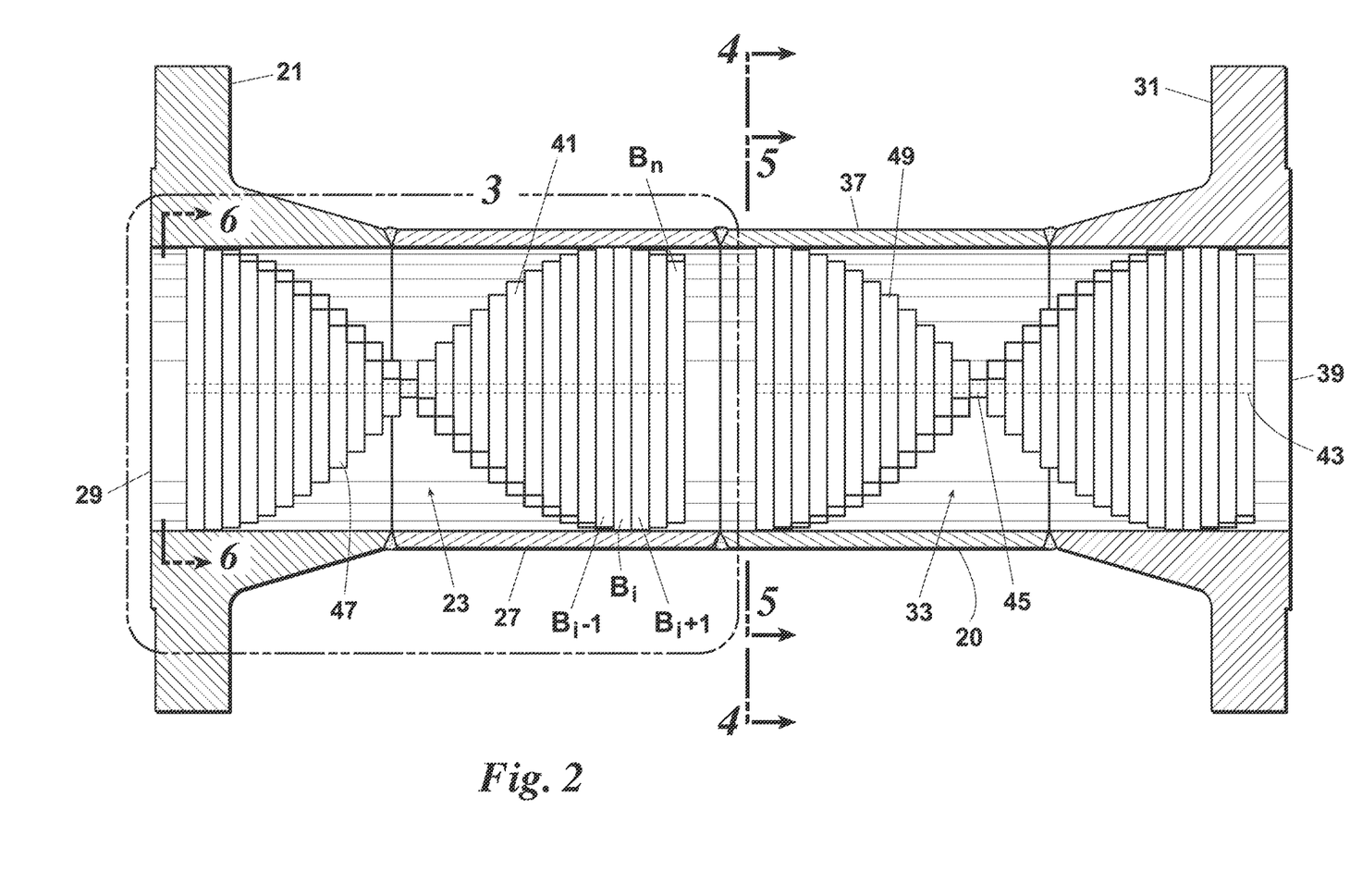
FIG. 2 is a partial section view taken along line 2-2 of FIG. 1.
Figure 3:
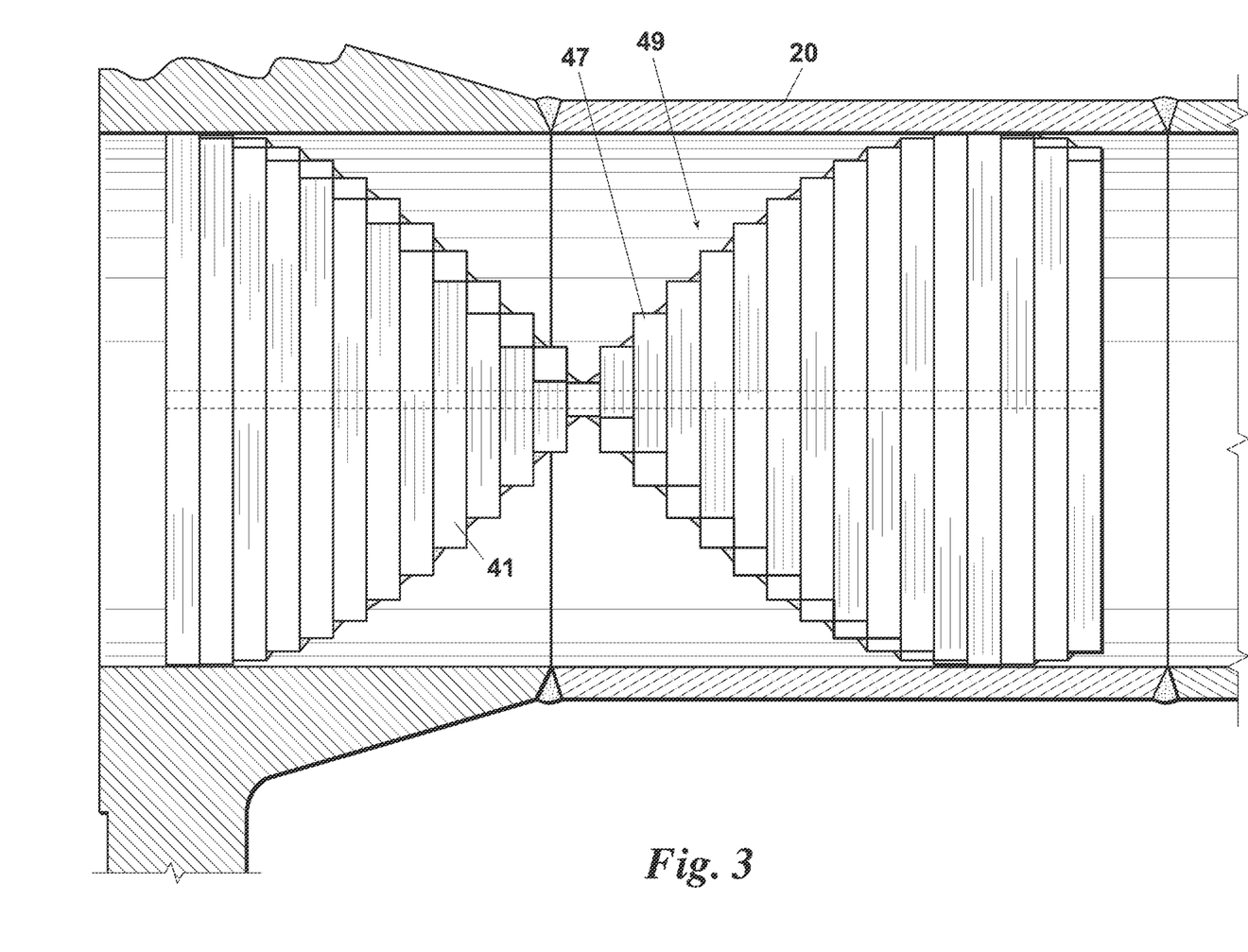
FIG. 3 is an enlarged detail view of the left hand helical baffle.
Figure 4:
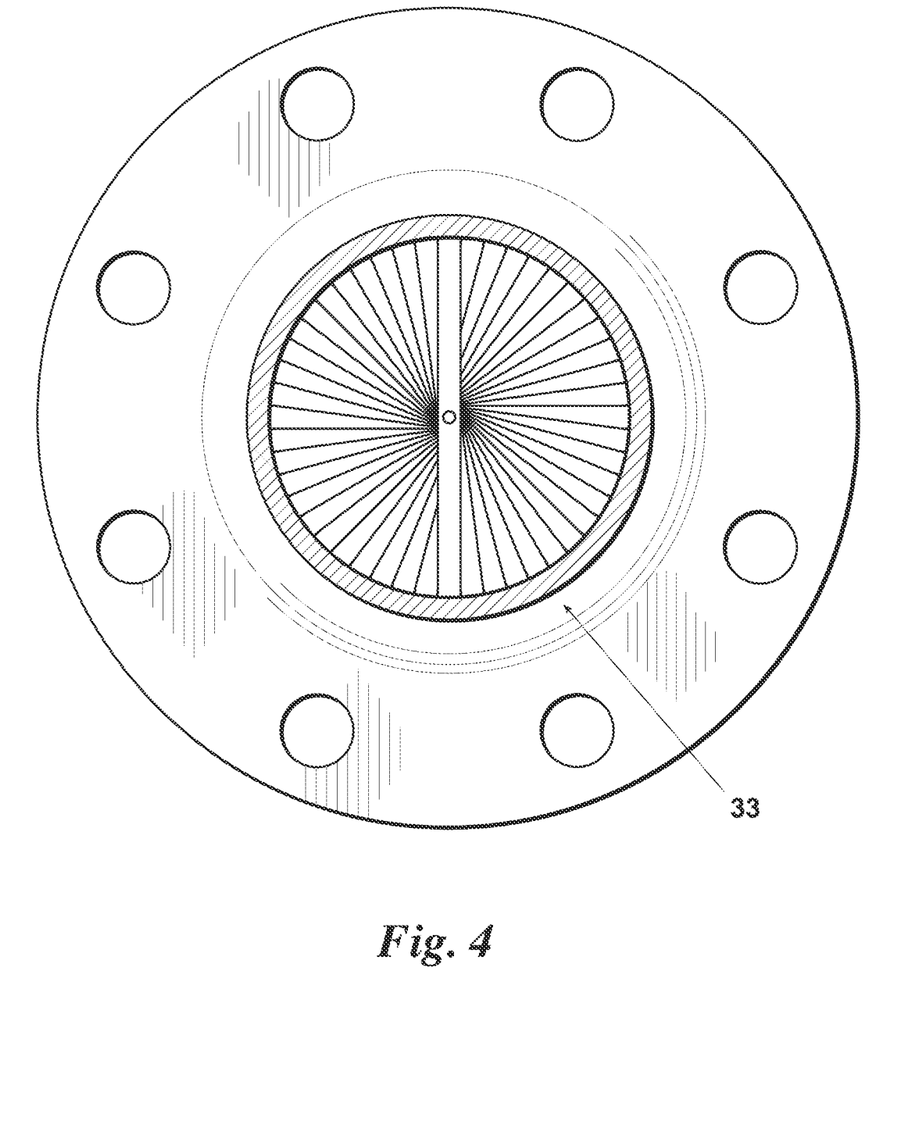
FIG. 4 is a section view taken along line 4-4 of FIG. 2.
Figure 5:
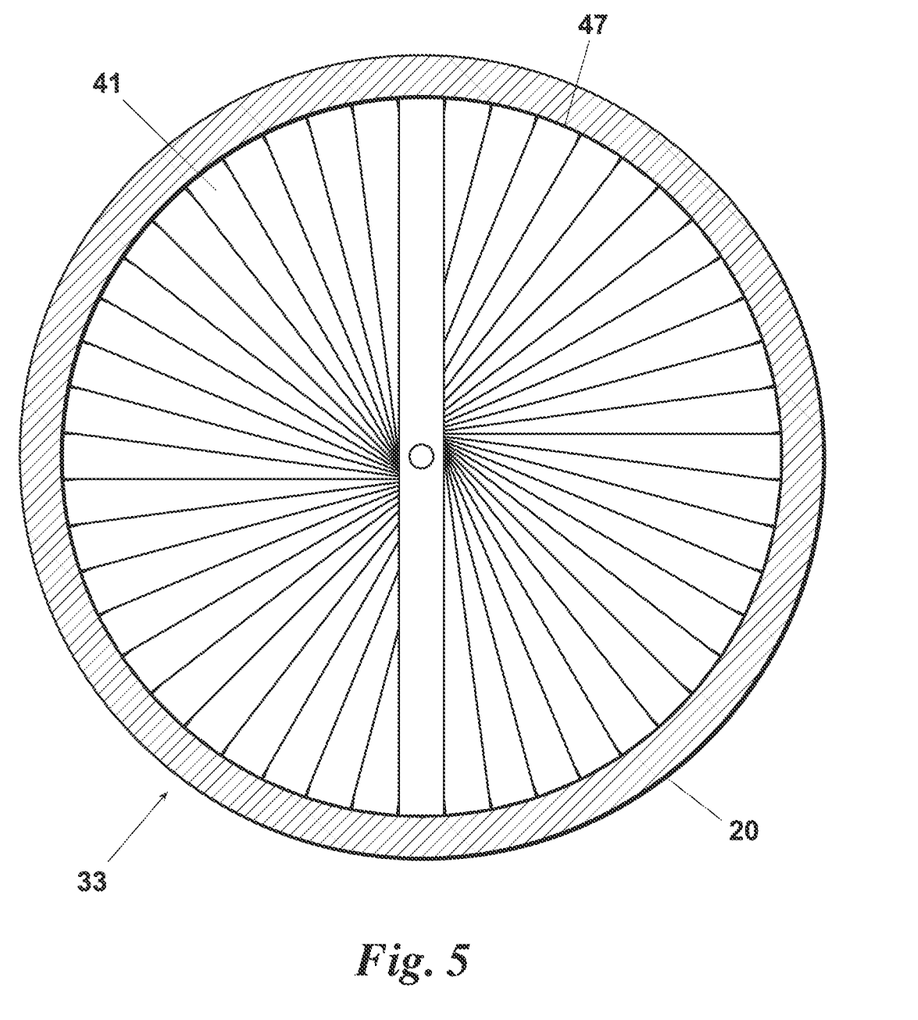
FIG. 5 is a section view taken along line 5-5 of FIG. 2 and showing details of a left-hand rotation helical baffle of this disclosure.
Figure 6:
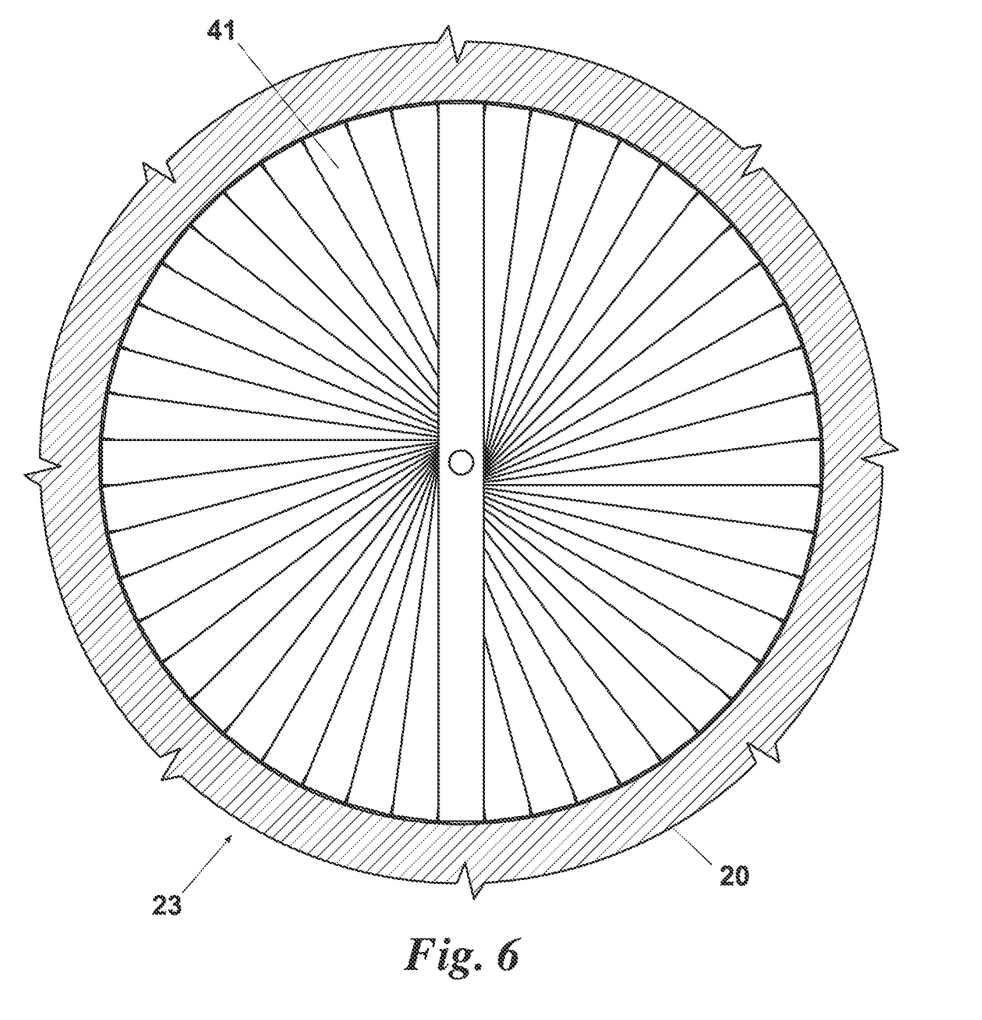
FIG. 6 is a section view taken along line 6-6 of FIG. 2 and showing details of a right-hand rotation helical baffle of this disclosure. Whether the first or second helical baffle is left- or right-hand is a matter of design choice.

Referring now to the drawing figures, embodiments of an in-line ultrasonic attenuator 10 of this disclosure includes a longitudinally extending pipe 20 having a first and a second end 21, 31, with a first and a second helical baffle 23, 33 located between the two ends 21, 31 and arranged coaxial to the longitudinal centerline 25 of the pipe 20. Each end 21, 31 may be a flanged end. The flanged end may have a serrated raised face and be sized and arranged for connection to the measurement section or measurement skid of a pipeline.

The longitudinally extending pipe 20 may include two pipe sections 27, 37 welded together, with the first helical baffle 23 housed within the first pipe section 27 and the second helical baffle 33 housed in the second pipe section 37. In embodiments, from flange 21 to flange 31 the attenuator 10 has a constant inside diameter. The helical baffle 23, 33 may be offset from the pipe end 29, 39 an amount effective so that welding of the pipe section 27, 37 to the flanged end 21, 31 and to the other pipe section 37, 27 may occur.

The length of each helical baffle 23, 33 therefore is typically less than that of the pipe section 27, 37. By way of a non-limiting example, in an attenuator 10 comprised of two 8-inch (20.32 cm) pipe sections 27, 37, each helical baffle 23, 33 can be offset one-half inch (1.27 cm) from each end 29, 39, each baffle 23, 33 being about 7 inches (~178 mm) in length. The length of pipe, as well as diameter of pipe, that may be used for attenuator 10 is application-specific. The pipe size may be in a range of 3 inches to 16 inches (80 mm to 400 mm).

Each helical baffle 23, 33 has a twist opposite that of the other, with one of the helical baffles 23, 33 having a right-hand twist and the other helical baffle 23, 33 having a left hand twist. The amount of twist is at least 180°. This amount of twist equates to one blind flange.

In some embodiments, each helical baffle 23, 33 has a twist greater than 180°, for example, 185° or 190° of twist. In other embodiments, the twist is in a range of 180° to 190°. In yet other embodiments the twist is in a range 180° to 200°, there being discrete values and subranges within the larger ranges being recited here.

There may be a single pair of baffles 23, 33 or two or more pairs of baffles 23, 33 arranged along the length of the attenuator 10. However, a single pair of helical baffles 23, 33 provides the equivalent of two blind flanges. In some embodiments, a helical baffle 23 or 33 may be extended to include both twist orientations, one twist being located in a first half of the baffle and the other being located in the second half.

The helical baffle 23, 33 may be constructed of a plurality bars 41 that are square in cross section, each bar 41 having a length sized equal to the inside diameter of the longitudinally extending pipe 20 and through which a center hole 43 has been drilled to receive a rod 45. Each bar 41 is twisted or angled a predetermined number of degrees about the rod 45 relative to an adjacent bar 41 and welded in place. There is an amount of overlap between the adjacent bars 41 such that, in an end view of the baffle 23, 33, there is no gap between the adjacent bars 41. There is, however, a step back between adjacent bars 41.

The ends 47 of the bars 45 form a corrugated surface along the outside (pipe wall-facing side 49) of the helical baffle 23, 33. The helical baffle 23, 33 appears square-shaped toward the end 49 and more triangular-shaped toward the center (rod 45).

Other methods of constructing the helical baffles 23, 33 may be used, including but not limited to twisting a flat piece of steel. However, providing a corrugated reflective surface rather than a smooth reflective surface creates more reflection points (and therefore improved attenuation performance). The helical baffle 23, 33 may be 3D-printed in part or in whole.

In embodiments, the attenuator 10 makes use of line pipe, that is, the same size pipe as that used by the ultrasonic gas flow meter. As already mentioned, the pipe size may be in a range of 3 inches to 16 inches (80 mm to 400 mm). Compared to prior art attenuators, embodiments of this disclosure reduce manufacturing costs by two-thirds or more in part because line pipe can be used. Prior art attenuators require larger size pipe than that used by the ultrasonic gas flow meter and therefore reducers for connection. The attenuator 10 can be in-line with the meter and not require any reducers, nor the elbows and bends of the prior art. This, in turn, reduces the overall footprint of the measurement skid which attenuator 10 may be a part.

By way of a non-limiting example, and using a 4 inch (100 mm) pipe, a left- and right-hand helical baffle 23, 33, each extending 7 inches (~178 mm) in length (axial direction), were formed by 28, ¼-inch (6.35 mm) square bars 41, each 4 inches (10.16 cm) long (radial direction) for 180° of twist, each bar 41 being angled relative to its adjacent bar 41 by about 6½°. The square bars 41 could be angled relative to the adjacent bar 41 by about 6¾° to provide 190° of twist. However, the angle cannot be so great that a cross-sectional gap forms between the adjacent bars 41.

Note that in the above example, half the circumference of the pipe is about 6.78 inches (~172 mm). Given each bar 41 provides ¼ inch (6.35 mm) of arc, approximately 27 bars 41 would be needed to cover half the circumference on each side of the pipe. This number may be used as a starting point for determining the total bars 41 required and the amount of angle between adjacent bars 41 required to provide at least 180° of twist. If ½ inch (12.7 mm) bars 41 were used, 14 bars 41 would be required since the number should be rounded up to the nearest whole integer. The 14 bars 41 could each be angled relative to the adjacent bar 41 by about 12⅞° for 180° of twist. In practice, the bars 41 might be angled by 13°, providing 182° of twist.

Using a 16 inch (400 mm) pipe as another example, half the circumference of the pipe is about 25 inches (635 mm). If ¼ inch (6.35 mm) bars 41 used, then 100 bars are required, each angled about 1.8° relative to one another for 180° of twist. A 2° angle would provide 200° of twist. If ½ inch (12.7 mm) bars are used, then 50 bars 41 are required, each angled relative to one another by 3.6°. From a practical perspective, 52 bars might be used with adjacent bars 41 angled 3.5° relative to one another to provide 182° of twist, 50 bars might be used and angled 4°, which would provide about 200° of twist. If ⅜ inch (9.525 mm) bar was used, then 67 bars 41 would be needed to provide 180° of twist.

As the diameter of pipe changes, so does the length of the bars 41, the length being in the radial direction. The number of bars 41 needed is a function of the pipe ID, width of the bars 41, and the predetermined amount of twist. Another consideration is the angle that can be held during construction of the baffle 23, 33. In embodiments, the bars 41 may be in a range of ¼" to ½" (6.35 mm to 12.7 mm), the width providing the arc angle (e.g. a ⅜" bar provides ⅜" arc angle (9.525 mm)). Generally, speaking as pipe diameter increases, the width of the bars 41 should increase to help reduce the number of bars 41 required to achieve, for example, a 180° of twist.

In general there are & total bars 41, where i is an integer from 1 to n, $B_1$ being the first bar 41 and $B_n$ being the last bar 41. The first bar $B_1$ is typically oriented vertically or horizontally. The angular orientation of adjacent bars $B_i$, $B_{i+1}$ are different from one another. Where there is 180° of twist, the last bar $B_n$ is oriented at the same vertical or horizontal orientation as bar $B_1$.

Other than the first bar $B_1$, each adjacent bar $B_{i+1}$ is set rearward of its preceding bar $B_1$. For bars $B_2$ to $B_{n-1}$, at least a portion of the front face 51 of bar $B_i$ is in contact with a portion of the rear face 53 of bar $B_{i-1}$ and a portion of the rear face 53 of bar $B_i$ is in contact with a portion of the front face of bar $B_{i+1}$.

A helical baffle 23, 33 of this disclosure provides minimal reduction in pipe cross-section. Because the front faces 51 are stepped back from one another, it is only the width of the first bar $B_1$ that reduces the cross section. In embodiments, cross section is reduced 5% or less. A 5% reduction in cross-section presents no detectable impact to gas flow rate through the attenuator 10. Essentially, the helical baffle 23 or 33 presents a stretched out blind flange, with only a small portion of each bar $B_2$ to $B_n$ presenting itself to the flow.

The helical baffles 23, 33 prevent ultrasonic waves generated by downstream equipment from traveling back to the flow meter and interfering with flow measurement. However, the baffles 23, 33 create sufficient open cross-section to provide adequate product flow through the attenuator without excessive pressure drop across the attenuator. For example, in tests conducted by the inventor, and using a 4 inch (80 mm) diameter pipe, no detectable pressure drop occurred until gas flow was at 100 psi (~689.5 kpa), at which point a pressure drop of less than 10 psi was detected. Because most ultrasonic gas flow meters max out at around 70 psi to 80 psi (~482.6 kpa to 551.6 kpa), the baffles 23, 33 present no pressure drop across the attenuator 10.

The embodiments described here may be modified by persons of skill in the art without departing from the scope of the following claims. The elements and limitations recited in the claims are entitled to their full range of equivalents.

The invention claimed is:

1. An in-line ultrasonic attenuator comprising:
   a longitudinally extending pipe having a first end, a second end, and a constant inside diameter extending an entire distance between the first and second ends;
   a first and a second helical baffle housed between the first and second ends and arranged in series with one another coaxial to the longitudinally extending pipe;
   the first helical baffle having first twist rotation and the second helical baffle having a second twist rotation opposite that of the first twist rotation, each twist rotation being at least 180°;
   each of the first and second helical baffles including a corrugated surface along a pipe wall facing side.

2. The in-line ultrasonic attenuator of claim 1, further comprising, each of the first and second helical baffles including a plurality of bars, each bar of the plurality having a length equal to that of the constant inside diameter of the longitudinally extending pipe and being oriented at a different angular orientation than a corresponding adjacent bar of the plurality.

3. The in-line ultrasonic attenuator of claim 2, wherein each bar of the plurality is square in cross-section.

4. A method for attenuating ultrasonic waves downstream of a ultrasonic gas flow meter, the method comprising:
   providing an in-line ultrasonic attenuator that includes:
      a longitudinally extending pipe having a first end, a second end, and a constant inside diameter extending an entire distance between the first and second ends;
      a first and a second helical baffle housed between the first and second ends and arranged in series with one another coaxial to the longitudinally extending pipe;
      the first helical baffle having first twist rotation and the second helical baffle having a second twist rotation opposite that of the first twist rotation, each twist rotation being at least 180°.

5. The method of claim 4, further comprising:
   attenuating the ultrasonic waves with the in-line ultrasonic attenuator.

6. The method of claim 5, further comprising:
   passing a natural gas flow along a pipe wall-facing side of the first and second helical baffles.

7. The method of claim 4, wherein each of the first and second helical baffles includes a plurality of bars, each bar of the plurality having a length equal to that of the constant inside diameter of the longitudinally extending pipe and being oriented at a different angular orientation than a corresponding adjacent bar of the plurality.

8. The method of claim 7, wherein each bar of the plurality is square in cross-section.

9. The method of claim 4, wherein each of the first and second helical baffles has a corrugated surface along a pipe wall-facing side.

10. The method of claim 7, wherein a reduction in cross-section of the constant inside diameter due to the first and second helical baffles is no greater than a width of a first bar of the plurality of bars.

11. The method of claim 4, wherein the first and second helical baffles reduce a cross-section of the constant inside diameter by no more than 5%.

12. The in-line ultrasonic attenuator of claim 2, wherein a reduction in cross-section of the constant inside diameter due to the first and second helical baffles is no greater than a width of a first bar of the plurality of bars.

13. The in-line ultrasonic attenuator of claim 1, wherein the first and second helical baffles reduce a cross-section of the constant inside diameter by no more than 5%.

14. An in-line ultrasonic attenuator comprising:
   a longitudinally extending pipe having a first end, a second end, and a constant inside diameter extending an entire distance between the first and second ends;
   a first and a second helical baffle housed between the first and second ends and arranged in series with one another coaxial to the longitudinally extending pipe;
   the first helical baffle having first twist rotation and the second helical baffle having a second twist rotation opposite that of the first twist rotation, each twist rotation being at least 180°;
   each of the first and second helical baffles including a plurality of bars, each bar of the plurality having a length equal to that of the constant inside diameter of the longitudinally extending pipe and being oriented at a different angular orientation than a corresponding adjacent bar of the plurality.

15. The in-line ultrasonic attenuator of claim 14, wherein each bar of the plurality is square in cross-section.

16. The in-line ultrasonic attenuator of claim 14, wherein a reduction in cross-section of the constant inside diameter due to the first and second helical baffles is no greater than a width of a first bar of the plurality of bars.

17. The in-line ultrasonic attenuator of claim 14 wherein the first and second helical baffles reduce a cross-section of the constant inside diameter by no more than 5%.

18. An in-line ultrasonic attenuator comprising:
   a longitudinally extending pipe having a first end, a second end, and a constant inside diameter extending an entire distance between the first and second ends;
   a first and a second helical baffle housed between the first and second ends and arranged in series with one another coaxial to the longitudinally extending pipe;
   the first helical baffle having first twist rotation and the second helical baffle having a second twist rotation opposite that of the first twist rotation, each twist rotation being at least 180°;
   wherein the first and second helical baffles reduce a cross-section of the constant inside diameter by no more than 5%.

19. The in-line ultrasonic attenuator of claim 18, further comprising, each of the first and second helical baffles including a plurality of bars, each bar of the plurality having a length equal to that of the constant inside diameter of the longitudinally extending pipe and being oriented at a different angular orientation than a corresponding adjacent bar of the plurality.

20. The in-line ultrasonic attenuator of claim 19, wherein each bar of the plurality is square in cross-section.

21. The in-line ultrasonic attenuator of claim 19, wherein the reduction in the cross-section of the constant inside diameter is no greater than a width of a first bar of the plurality of bars.

22. The in-line ultrasonic attenuator of claim 18, wherein each of the first and second helical baffles has a corrugated surface along a pipe wall facing side.

23. An end treatment adapted for use with, and connection to, an ultrasonic gas flow meter section of a measurement skid, the end treatment including an in-line ultrasonic attenuator comprising:
a longitudinally extending pipe having a first end, a second end, and a constant inside diameter extending an entire distance between the first and second ends;
a first and a second helical baffle housed between the first and second ends and arranged in series with one another coaxial to the longitudinally extending pipe;
the first helical baffle having first twist rotation and the second helical baffle having a second twist rotation opposite that of the first twist rotation, each twist rotation being at least 180° and a rod extending through a center of the first and second helical baffles.

24. The end treatment of claim 23, further comprising, each of the first and second helical baffles including a plurality of bars, each bar of the plurality having a length equal to that of the constant inside diameter of the longitudinally extending pipe and being oriented at a different angular orientation than a corresponding adjacent bar of the plurality.

25. The end treatment of claim 24, wherein each bar of the plurality is square in cross-section.

26. The in-line ultrasonic attenuator of claim 24, wherein a reduction in cross-section of the constant inside diameter due to the first and second helical baffles is no greater than a width of a first bar of the plurality of bars.

27. The end treatment of claim 23, wherein each of the first and second helical baffles has a corrugated surface along a pipe wall facing side.

28. The end treatment of claim 23, wherein the first and second helical baffles reduce a cross-section of the constant inside diameter by no more than 5%.

29. The end treatment of claim 1, wherein the first and second ends are flanged ends.

30. The end treatment of claim 23, each of the first and second helical baffles including a plurality of bars, each bar of the plurality having a length equal to that of the constant inside diameter of the longitudinally extending pipe and being oriented at a different angular orientation than a corresponding adjacent bar of the plurality.

* * * * *